United States Patent
Horie

(10) Patent No.: US 12,078,617 B2
(45) Date of Patent: Sep. 3, 2024

(54) MATERIAL TESTER

(71) Applicant: SHIMADZU CORPORATION, Kyoto (JP)

(72) Inventor: Keisuke Horie, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 409 days.

(21) Appl. No.: 17/573,637

(22) Filed: Jan. 12, 2022

(65) Prior Publication Data

US 2022/0283063 A1    Sep. 8, 2022

(30) Foreign Application Priority Data

Mar. 3, 2021  (JP) ................................ 2021-033810

(51) Int. Cl.
| | |
|---|---|
| G01N 3/10 | (2006.01) |
| G01N 3/02 | (2006.01) |
| G01N 3/06 | (2006.01) |
| G01N 35/00 | (2006.01) |

(52) U.S. Cl.
CPC .............. G01N 3/10 (2013.01); G01N 3/02 (2013.01); G01N 3/066 (2013.01); *G01N 2035/0091* (2013.01); *G01N 2203/0017* (2013.01); *G01N 2203/0048* (2013.01); *G01N 2203/0617* (2013.01)

(58) Field of Classification Search
CPC ............ G01N 3/02; G01N 3/10; G01N 3/066; G01N 2203/0617; G01N 2203/0017; G01N 2203/0048; G01N 2035/0091
See application file for complete search history.

(56) References Cited

U.S. PATENT DOCUMENTS

| | | | | |
|---|---|---|---|---|
| 2002/0144556 | A1* | 10/2002 | Hasegawa | ................ G01N 3/08 73/831 |
| 2013/0205912 | A1* | 8/2013 | Yoshihara | ................ G01N 3/08 73/834 |
| 2017/0300035 | A1 | 10/2017 | Kawai et al. | |
| 2018/0313730 | A1* | 11/2018 | Yano | .......................... G01N 3/42 |
| 2021/0033510 | A1* | 2/2021 | Pope | .......................... G01N 3/62 |
| 2021/0124338 | A1* | 4/2021 | Florea | .............. G01N 35/00871 |
| 2021/0215586 | A1* | 7/2021 | Shishido | ................. G06T 7/001 |

FOREIGN PATENT DOCUMENTS

| | | |
|---|---|---|
| JP | 2020169836 | 10/2020 |
| WO | 2016051544 | 4/2016 |

OTHER PUBLICATIONS

"Office Action of Japan Counterpart Application", issued on Jan. 30, 2024, with English translation thereof, p. 1-p. 7.
"Office Action of Japan Counterpart Application", issued on May 14, 2024, with English translation thereof, pp. 1-5.

* cited by examiner

*Primary Examiner* — Jonathan M Dunlap
(74) *Attorney, Agent, or Firm* — JCIPRNET

(57) ABSTRACT

A tensile tester includes a tester body having at least one detector and a controller, and the controller includes a first branch setting unit that sets a first branching condition at a first branch point at which a test condition branches into two or more test conditions in association with a detection result of the detector, a first condition setting unit that sets a first test condition that is a test condition before the first branch point, and a second condition setting unit that sets a second test condition that is a test condition after the first branch point.

7 Claims, 12 Drawing Sheets

FIG.3

| | | AREA 1 | AREA 2 | AREA 3 | AREA 4 | AREA 5 | AREA 6 | AREA 7 | AREA 8 | AREA 9 | AREA 10 |
|---|---|---|---|---|---|---|---|---|---|---|---|
| COPY | INSERT | DELETE | CLEAR | | ↑ ↓ | MAIN ROUTINE ▼ | | | | | |
| MOVEMENT | | ↑ UP ▼ STROKE ▼ 1.000 mm/min ▼ | ↑ HOLD ▼ STROKE ▼ | ↗ UP ▼ STROKE ▼ 1.000 mm/min ▼ | ↑ HOLD ▼ STROKE ▼ | CONDITION BRANCH ▼ | OFF ▼ | OFF ▼ | OFF ▼ | OFF ▼ | OFF ▼ |
| | TARGET VALUE ▼ TEST FORCE ▼ 10 N | HOLD TIME ▼ 10 sec | TARGET VALUE ▼ TEST FORCE ▼ 20 N | HOLD TIME ▼ 10 sec | CONDITION TEST FORCE 15 N | | | | | |
| SWITCHING POINT TO NEXT AREA | | INPUT OF SWITCHING POINT | INPUT OF SWITCHING POINT | INPUT OF SWITCHING POINT | INPUT OF SWITCHING POINT | INPUT OF SWITCHING POINT | | | | | |
| SWITCHING POINT GetData | | NONE | SAME AS IN PREVIOUS AREA | SAME AS IN PREVIOUS AREA | SAME AS IN PREVIOUS AREA | SAME AS IN PREVIOUS AREA | | | | | |
| SAMPLING | | 10msec | NONE | NONE | NONE | NONE | | | | | |
| REPEAT | | NONE | NONE | NONE | NONE | NONE | | | | | |

| | AREA 1 | AREA 2 | AREA 3 | AREA 4 | AREA 5 | AREA 6 | AREA 7 | AREA 8 | AREA 9 | AREA 10 |
|---|---|---|---|---|---|---|---|---|---|---|
| COPY / INSERT / DELETE / CLEAR | | | | | | SUBROUTINE A | | | | |
| MOVEMENT | UP<br>STROKE 100.00 mm/min | OFF | OFF | OFF | OFF | OFF | OFF | OFF | OFF | OFF |
| | TARGET VALUE<br>TEST FORCE 100 | | | | | | | | | |
| SWITCHING POINT TO NEXT AREA | N<br>INPUT OF SWITCHING POINT | | | | | | | | | |
| SWITCHING POINT GetData | NONE | | | | | | | | | |
| SAMPLING | 10msec | | | | | | | | | |
| REPEAT | NONE | | | | | | | | | |

| | | AREA 1 | AREA 2 | AREA 3 | AREA 4 | AREA 5 | AREA 6 | AREA 7 | AREA 8 | AREA 9 | AREA 10 |
|---|---|---|---|---|---|---|---|---|---|---|---|
| COPY | INSERT | DELETE | CLEAR | | | SUBROUTINE B | | | | | |
| MOVEMENT | | UP | DOWN | UP | CONDITION BRANCH | | OFF | OFF | OFF | OFF | OFF |
| | | STROKE | STROKE | STROKE | | | | | | | |
| | | 5.000 | 5.000 | 5.000 | | | | | | | |
| | | mm/min | mm/min | mm/min | | | | | | | |
| | | TARGET VALUE | TARGET VALUE | TARGET VALUE | CONDITION | | | | | | |
| | | TEST FORCE | TEST FORCE | TEST FORCE | STROKE | | | | | | |
| | | 100 | 10 | 100 | 10 | | | | | | |
| | | N | N | N | mm | | | | | | |
| SWITCHING POINT TO NEXT AREA | | INPUT OF SWITCHING POINT | INPUT OF SWITCHING POINT | INPUT OF SWITCHING POINT | INPUT OF SWITCHING POINT | | | | | | |
| SWITCHING POINT GetData | | NONE | SAME AS IN PREVIOUS AREA | SAME AS IN PREVIOUS AREA | SAME AS IN PREVIOUS AREA | | | | | | |
| SAMPLING | | 10msec | NONE | NONE | NONE | | | | | | |
| REPEAT | | NONE | NONE | NONE | NONE | | | | | | |

FIG.9

MATERIAL TESTER

CROSS-REFERENCE TO RELATED APPLICATIONS

The present application claims priority under 35 U.S.C. § 119 to Japanese Patent Application No. 2021-033810 filed on Mar. 3, 2021. The content of the application is incorporated herein by reference in its entirety.

BACKGROUND

Technical Field

The present invention relates to a material tester.

Related Art

Various techniques for setting test conditions in a material tester are known.

For example, a control device of a material tester described in JP 2020-169836 A is a control device of a material tester that performs a material test by applying a test force to a test piece using a loading mechanism, and includes a controller that executes velocity control for controlling the loading mechanism that applies the test force to the test piece so that a velocity indicating a change amount per unit time of a displacement amount of the test piece coincides with a target value of the velocity, and position control for controlling the loading mechanism so that the displacement amount coincides with a target value of the displacement amount. The controller switches from the velocity control to the position control when a specific condition is satisfied.

SUMMARY

However, in the conventional material tester described in JP 2020-169836 A and the like, it is difficult to branch a test condition into a plurality of test conditions during the test. In other words, it is difficult to set a test condition so as to branch into a plurality of test conditions during the test.

The present invention has been made in view of such circumstances, and an object of the present invention is to provide a material tester capable of setting a test condition so as to branch into a plurality of test conditions during the test.

A material tester according to an aspect of the present invention includes: a tester body having at least one detector; and a controller, and the controller includes a branch setting unit that sets a branching condition at a branch point at which a test condition branches into two or more test conditions in association with a detection result of the detector, a first condition setting unit that sets a first test condition that is a test condition before the branch point, and a second condition setting unit that sets a second test condition that is a test condition after the branch point.

The material tester according to the aspect of the present invention can set a test condition so as to branch into a plurality of test conditions during the test.

BRIEF DESCRIPTION OF DRAWINGS

FIG. 3 is a screen view illustrating an example of a first test condition display screen that displays a first test condition;

FIG. 5 is a screen view illustrating an example of a second test condition display screen that displays a second test condition;

FIG. 6 is a screen view illustrating another example of the second test condition display screen that displays second test conditions;

FIG. 9 is a screen view illustrating another example of the third test condition display screen that displays the third test condition;

DETAILED DESCRIPTION

The present embodiment will be described below with reference to the drawings.

1. Configuration of a Tensile Tester

Figure 1:
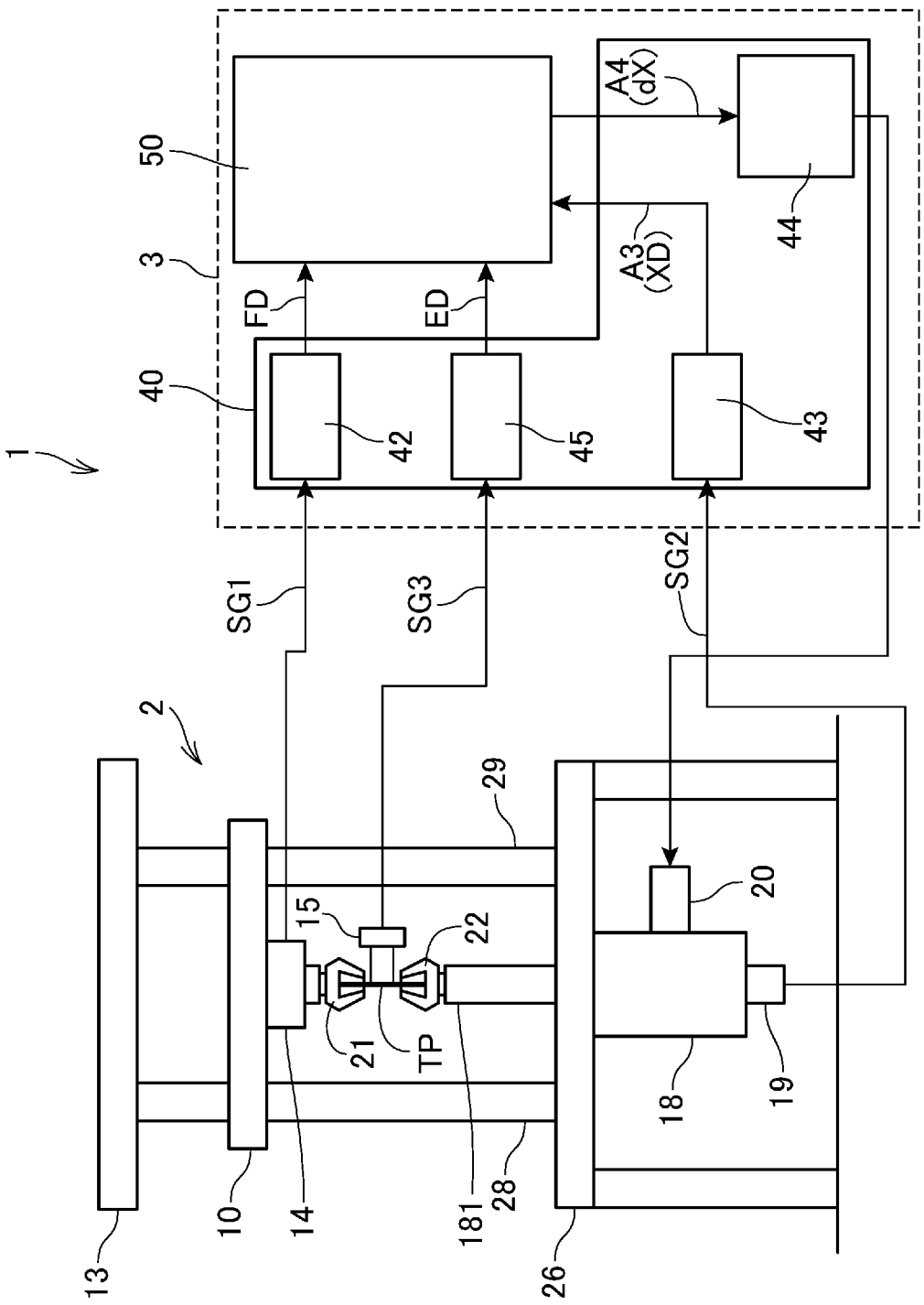
FIG. 1 is a diagram illustrating an example of a configuration of a tensile tester according to the present embodiment.

FIG. 1 is a diagram illustrating an example of a configuration of a tensile tester 1 according to the present embodiment.

The tensile tester 1 according to the present embodiment performs a tensile test for measuring the mechanical properties of a sample such as tensile strength, yield point, elongation, and drawing by applying a test force FP to a test piece TP. The test force FP is a tensile force.

The tensile tester 1 includes a tester body 2 that performs a tensile test by applying the test force FP to the test piece TP that is a material under test, and a control unit 3 that controls tensile test operation by the tester body 2.

The tensile tester 1 corresponds to an example of a "material tester."

As illustrated in FIG. 1, the tester body 2 is configured such that a load frame is formed on a base 26 by a pair of pillars 28 and 29 and a yoke 13, and a crosshead 10 is fixed to pillars 28 and 29.

A hydraulic actuator 18 is disposed on the base 26, and a lower gripper 22 for gripping the lower end of the test piece TP is attached to a piston rod 181 of the hydraulic actuator 18. In addition, an upper gripper 21 for gripping the upper end of the test piece TP is attached to the crosshead 10 via a load cell 14.

In the hydraulic actuator 18, the pressure oil direction and the pressure oil amount are controlled by a servo valve 20, so that the piston rod 181 extends or retracts. As a result, the distance between the upper gripper 21 and the lower gripper 22 increases or decreases, causing the test force FP to be applied to the test piece TP fixed between the upper gripper 21 and the lower gripper 22. In addition, the stroke of the hydraulic actuator 18, that is, the displacement X of the test piece TP is detected by a linear variable differential transformer 19 attached to the hydraulic actuator 18.

The load cell 14 is a sensor that measures a test force FP that is a tensile load applied to the test piece TP and outputs a test force measurement signal SG1 to the control unit 3.

The linear variable differential transformer 19 is a sensor that measures the displacement X of the test piece TP and outputs a displacement measurement signal SG2 corresponding to the displacement X to the control unit 3.

The load cell 14 corresponds to an example of a "detector."

The linear variable differential transformer 19 corresponds to an example of a "detector."

A displacement sensor 15 is disposed on the test piece TP. For the test piece TP, for example, a dumbbell-shaped test piece formed by constricting the center is used. The displacement sensor 15 is a sensor that measures the elongation measurement value ED by measuring a distance between a pair of gauge marks of the test piece TP, and outputs an elongation measurement signal SG3 to the control unit 3. The pair of gauge marks are arranged so as to correspond to an upper portion and a lower portion of the region where the test piece TP is constricted.

The displacement sensor 15 corresponds to an example of a "detector."

The control unit 3 includes a signal input/output device 40 and a control device 50.

The signal input/output device 40 has an input/output interface circuit that transmits and receives signals to and from the tester body 2, and in the present embodiment, has a first sensor amplifier 42, a second sensor amplifier 45, a third sensor amplifier 43, and a servo amplifier 44.

The first sensor amplifier 42 amplifies the test force measurement signal SG1 output from the load cell 14 to generate a test force measurement value FD, and outputs the test force measurement value FD to the control device 50.

The second sensor amplifier 45 amplifies the elongation measurement signal SG3 output from the displacement sensor 15 to generate an elongation measurement value ED and outputs the elongation measurement value ED to the control device 50.

The third sensor amplifier 43 amplifies the displacement measurement signal SG2 output from the linear variable differential transformer 19 and outputs a displacement measurement signal A3 indicating a displacement measurement value XD to the control device 50 as a digital signal.

The servo amplifier 44 is a device that controls a servo valve 20 according to control by the control device 50. The control device 50 calculates a command value dX of the displacement measurement value XD and transmits a command signal A4 indicating the command value dX to the servo valve 20.

2. Configuration of a Control Device

The control device 50 controls operation of the tester body 2 based on operation from a user. In addition, the control device 50 causes the tester body 2 to execute a tensile test.

In the present embodiment, the "user" includes an operator who operates the tester body 2.

Figure 2:
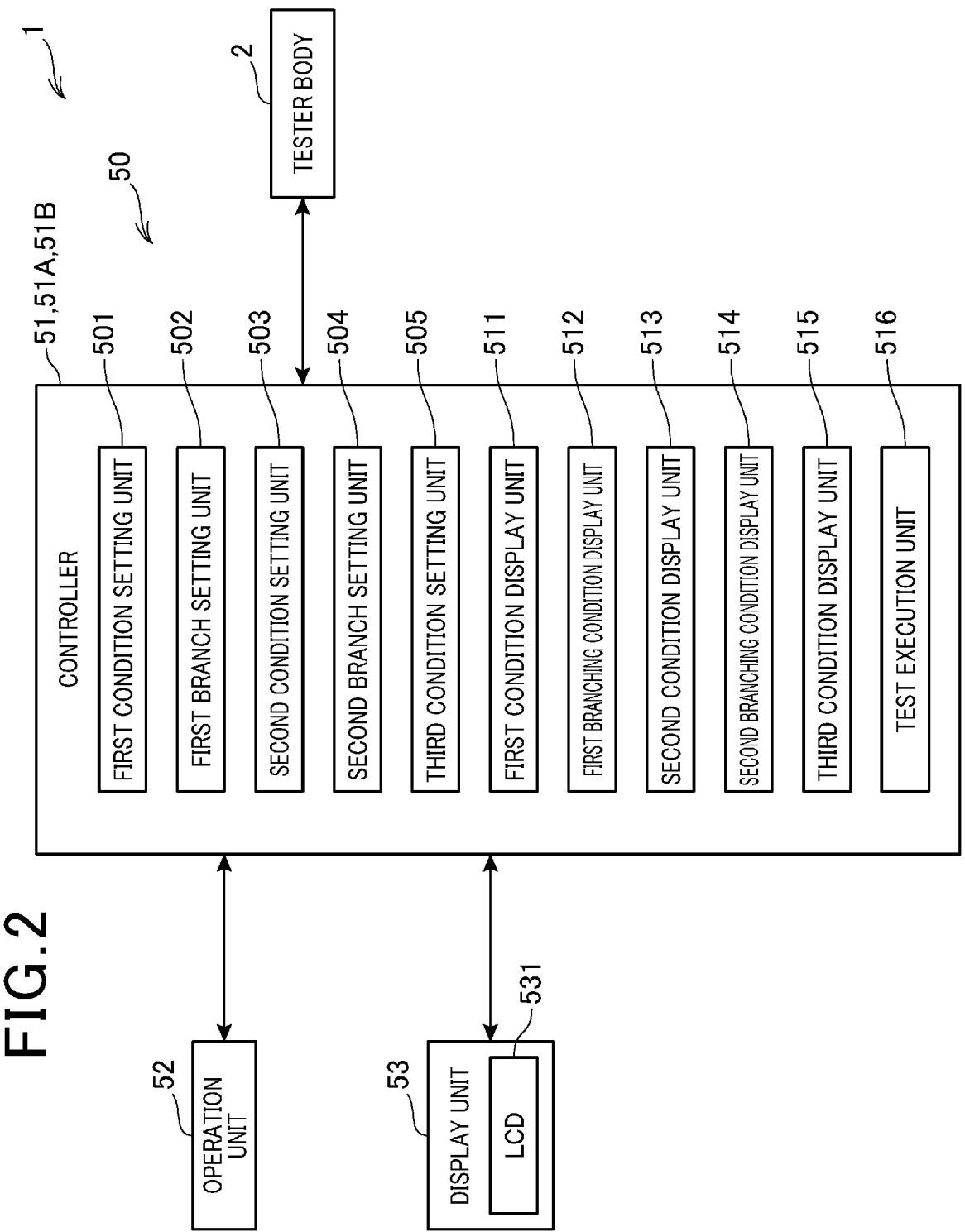
FIG. 2 is a diagram illustrating an example of a configuration of a control device according to the present embodiment.

FIG. 2 is a diagram illustrating an example of a configuration of the control device 50 according to the present embodiment.

The control device 50 includes a controller 51, an operation unit 52, and a display unit 53.

The operation unit 52 includes, for example, a keyboard, a mouse, and the like, receives operation from a user, and outputs an operation signal corresponding to the operation to the controller 51.

The display unit 53 includes a liquid crystal display (LCD) 531 and the like, and displays various images on the LCD 531 in accordance with an instruction from the controller 51.

The LCD 531 corresponds to an example of a "display."

The controller 51 includes, for example, a personal computer, and controls operation of the control device 50. The controller 51 includes a processor 51A and a memory 51B.

The processor 51A includes a central processing unit (CPU), a micro-processing unit (MPU), or the like.

The memory 51B includes a read only memory (ROM), a random access memory (RAM), or the like. In addition, the memory 51B may include a hard disk drive (HDD) or a solid state drive (SSD).

The memory 51B stores a control program.

In addition, the controller 51 may include programmed hardware such as a digital signal processor (DSP) or a field programmable gate array (FPGA). Furthermore, the controller 51 may include a system-on-a-chip (SoC)-FPGA.

As illustrated in FIG. 2, the controller 51 includes a first condition setting unit 501, a first branch setting unit 502, a second condition setting unit 503, a second branch setting unit 504, a third condition setting unit 505, a first condition display unit 511, a first branching condition display unit 512, a second condition display unit 513, a second branching condition display unit 514, a third condition display unit 515, and a test execution unit 516.

Specifically, when the processor 51A of the controller 51 executes a control program stored in the memory 51B, the processor 51A functions as the first condition setting unit 501, the first branch setting unit 502, the second condition setting unit 503, the second branch setting unit 504, the third condition setting unit 505, the first condition display unit 511, the first branching condition display unit 512, the second condition display unit 513, the second branching condition display unit 514, the third condition display unit 515, and the test execution unit 516.

The first branch setting unit 502 corresponds to an example of a "branch setting unit."

The first branching condition display unit 512 corresponds to an example of a "branching condition display unit."

The first condition setting unit 501 sets a first test condition CT1 that is a test condition before a first branch point BR1 based on the user's operation on the operation unit 52.

The first test condition CT1 includes a plurality of steps ST.

Each of the plurality of steps ST includes a movement condition CM that defines a movement to be executed by the tester body 2 and a switching condition CS that switches the movement condition CM to a movement condition CM of a next step ST.

The steps ST will be further described with reference to FIGS. 3, 5, 6, 8, and 9.

The first test condition CT1 will be further described with reference to FIG. 3.

The movement condition CM includes at least one of a test force target value FT, a test force velocity target value FVT, a displacement target value XT, and a displacement velocity target value XVT. The test force target value FT is a target value of the test force FP. The test force velocity target value FVT is a target value of the velocity at which the test force FP changes. The displacement target value XT is a target value of the displacement X of the test piece TP. The displacement velocity target value XVT is a target value of the velocity at which the displacement X of the test piece TP changes.

The switching condition CS includes at least one of the test force target value FT, the displacement target value XT, and a movement time TM.

The movement condition CM and the switching condition CS will be further described with reference to FIGS. 3, 5, 6, 8, and 9.

The first branch setting unit 502 sets a first branching condition CB1 at a first branch point BR1 at which the first test condition CT1 branches into two or more second test conditions CT2 based on the user's operation on the operation unit 52.

In addition, the first branch setting unit 502 sets the first branching condition CB1 in association with at least one of the detection result of the load cell 14, the detection result of the displacement sensor 15, and the detection result of the linear variable differential transformer 19.

The detection result of the load cell 14 corresponds to the test force measurement value FD. The detection result of the displacement sensor 15 corresponds to the elongation measurement value ED. The detection result of the linear variable differential transformer 19 corresponds to the displacement measurement value XD.

The first branch point BR1 corresponds to an example of a "branch point," and the first branching condition CB1 corresponds to an example of a "branching condition."

The first branching condition CB1 will be further described with reference to FIG. 4.

The second condition setting unit 503 sets a second test condition CT2 that is a test condition after the first branch point BR1 based on the user's operation on the operation unit 52.

The second test condition CT2 includes at least two test conditions CT. For example, the second test condition CT2 includes a second A test condition CT2A and a second B test condition CT2B.

Each of the second A test condition CT2A and the second B test condition CT2B includes at least one step ST.

Each of the steps ST includes a movement condition CM that defines a movement to be executed by the tester body 2 and a switching condition CS that switches the movement condition CM to a movement condition CM of a next step ST.

The second A test condition CT2A will be further described with reference to FIG. 5.

The second B test condition CT2B will be further described with reference to FIG. 6.

The second branch setting unit 504 sets a second branching condition CB2 at a second branch point BR2 at which the second test condition CT2 branches into two or more third test conditions CT3 based on the user's operation on the operation unit 52.

In addition, the second branch setting unit 504 sets the second branching condition CB2 in association with at least one of the detection result of the load cell 14, the detection result of the displacement sensor 15, and the detection result of the linear variable differential transformer 19.

The second branching condition CB2 will be further described with reference to FIG. 7.

The third condition setting unit 505 sets a third test condition CT3 that is a test condition after the second branch point BR2 based on the user's operation on the operation unit 52.

The third test condition CT3 includes at least two test conditions. For example, the third test condition CT3 includes a third A test condition CT3A and a third B test condition CT3B.

Each of the third A test condition CT3A and the third B test condition CT3B includes at least one step ST.

Each of the steps ST includes a movement condition CM that defines a movement to be executed by the tester body 2 and a switching condition CS that switches the movement condition CM to a movement condition CM of a next step ST.

The third A test condition CT3A will be further described with reference to FIG. 8.

The third B test condition CT3B will be further described with reference to FIG. 9.

The first condition display unit 511 displays the first test condition CT1 on the LCD 531 based on the user's operation on the operation unit 52. The first condition display unit 511 displays, for example, a first condition display screen 600 illustrated in FIG. 3 on the LCD 531.

The first condition display unit 511 also displays a first object BJ1 that receives an instruction to display the first branching condition CB1 on the LCD 531.

In addition, the first condition display unit 511 displays a second object BJ2 that receives an instruction to display the second test condition CT2 on the LCD 531.

Furthermore, the first condition display unit 511 displays the movement condition CM and the switching condition CS that define each of the plurality of steps ST in the first test condition CT1 so that the steps are arranged in the horizontal direction of the LCD 531.

The first test condition CT1 and the first object BJ1 will be further described with reference to FIG. 3.

The second object BJ2 will be further described with reference to FIGS. 3, 6, 7, 8, and 9.

The first branching condition display unit 512 displays the first branching condition CB1 on the LCD 531. The first branching condition display unit 512 displays, for example, a first branching condition display screen 700 illustrated in FIG. 4 on the LCD 531.

The first branching condition display unit 512 displays the first branching condition CB1 on the LCD 531 when a predetermined operation is performed on the first object BJ1.

The first branching condition CB1 will be further described with reference to FIG. 4.

The second condition display unit 513 displays the second test condition CT2 on the LCD 531. The second condition display unit 513 displays, for example, a second test condition display screen 650 illustrated in FIG. 5 and a second test condition display screen 660 illustrated in FIG. 6 on the LCD 531.

The second condition display unit 513 displays the second test condition CT2 on the LCD 531 when a predetermined operation is performed on the second object BJ2.

The second test condition CT2 will be further described with reference to FIGS. 5 and 6.

In addition, the second condition display unit 513 displays a third object BJ3 that receives an instruction to display the first test condition CT1 on the LCD 531.

The second condition display unit 513 also displays a fourth object BJ4 that receives an instruction to display the second branching condition CB2 on the LCD 531.

Furthermore, the second condition display unit 513 displays a fifth object BJ5 that receives an instruction to display the third test condition CT3 on the LCD 531.

The third object BJ3 and the fifth object BJ5 will be further described with reference to FIGS. 3, 6, 7, 8, and 9.

The fourth object BJ4 will be further described with reference to FIG. 6.

The second branching condition display unit 514 displays the second branching condition CB2 on the LCD 531.

The second branching condition display unit 514 displays the second branching condition CB2 on the LCD 531 when a predetermined operation is performed on the fourth object BJ4.

The second branching condition CB2 will be further described with reference to FIG. 7.

The third condition display unit 515 displays the third test condition CT3 on the LCD 531.

The third condition display unit 515 displays the third test condition CT3 on the LCD 531 when a predetermined operation is performed on the fifth object BJ5.

In addition, the third condition display unit 515 displays the third object BJ3 that receives an instruction to display the first test condition CT1 on the LCD 531.

Furthermore, the third condition display unit 515 displays the second object BJ2 that receives an instruction to display the second test condition CT2 on the LCD 531.

The third test condition CT3 will be further described with reference to FIGS. 8 and 9.

The test execution unit 516 causes the tester body 2 to execute a tensile test based on the test conditions set by the first condition setting unit 501, the first branch setting unit 502, the second condition setting unit 503, the second branch setting unit 504, and the third condition setting unit 505.

The test conditions include the first test condition CT1, the first branching condition CB1, the second test condition CT2, the second branching condition CB2, and the third test condition CT3.

3. Screen Displayed on the Lcd

Next, screens to be displayed on the LCD 531 by each of the first condition display unit 511, the first branching condition display unit 512, the second condition display unit 513, the second branching condition display unit 514, and the third condition display unit 515 will be described with reference to FIGS. 3 to 9.

FIG. 3 is a screen view illustrating an example of the first condition display screen 600 that displays the first test condition CT1. The first condition display screen 600 is displayed by the first condition display unit 511.

The first test condition CT1 is displayed on the first condition display screen 600. As illustrated in FIG. 3, the first condition display screen 600 includes a movement condition display section 610, a switching condition display section 620, a test condition selection section 630, and a branch display section 640.

The first test condition CT1 includes a first step ST11, a second step ST12, a third step ST13, a fourth step ST14, and a fifth step ST15. That is, the first test condition CT1 includes five steps ST.

The movement condition display section 610 displays the movement condition CM in each of the first step ST11 to the fifth step ST15. The switching condition display section 620 displays the switching condition CS in each of the first step ST11 to the fifth step ST15 in association with the movement condition CM.

In addition, the movement condition display section 610 displays the movement condition CM and the switching condition CS in each of the first step ST11 to the fifth step ST15 so that the steps are arranged in the horizontal direction of the LCD 531.

As illustrated in FIG. 3, the movement condition CM in the first step ST11 is that the displacement velocity target value XVT is 1.000 mm/min. In FIGS. 3 and 5 to 9, displacement X is referred to as "stroke."

That is, in the first step ST11, the test execution unit 516 calculates the command value dX of the displacement measurement value XD so that the velocity at which the displacement X of the test piece TP changes coincides with the displacement velocity target value XVT, and transmits the command signal A4 indicating the command value dX to the servo valve 20. In this case, the test execution unit 516 executes constant displacement velocity control.

In addition, as illustrated in FIG. 3, the switching condition CS in the first step ST11 is that the test force FP reaches 10 N. That is, when the test force FP reaches 10 N, the test execution unit 516 ends the movement of the first step ST11 and starts the movement of the second step ST12.

As illustrated in FIG. 3, the movement condition CM in the second step ST12 is to keep the displacement X constant. That is, in the second step ST12, the test execution unit 516 calculates the command value dX of the displacement measurement value XD so that the displacement X of the test piece TP becomes constant, and transmits the command signal A4 indicating the command value dX to the servo valve 20. In this case, the test execution unit 516 executes constant displacement control.

In addition, as illustrated in FIG. 3, the switching condition CS in the second step ST12 is that the movement time TM reaches 10 sec. That is, when the elapsed time from the start of the movement of the second step ST12 reaches 10 sec, the test execution unit 516 ends the movement of the second step ST12 and starts the movement of the third step ST13.

As illustrated in FIG. 3, the movement condition CM in the third step ST13 is that the displacement velocity target value XVT is 1.000 mm/min. That is, in the third step ST13, the constant displacement velocity control is executed as in the first step ST11.

In addition, as illustrated in FIG. 3, the switching condition CS in the third step ST13 is that the test force FP reaches 20 N. That is, when the test force FP reaches 20 N, the test execution unit 516 ends the movement of the third step ST13 and starts the movement of the fourth step ST14.

As illustrated in FIG. 3, the movement condition CM in the fourth step ST14 is to keep the displacement X constant. That is, in the fourth step ST14, the constant displacement control is executed as in the second step ST12.

In addition, as illustrated in FIG. 3, the switching condition CS in the fourth step ST14 is that the movement time TM reaches 10 sec. That is, when the elapsed time from the start of the movement of the fourth step ST14 reaches 10 sec, the test execution unit 516 ends the movement of the fourth step ST14 and starts the movement of the fifth step ST15.

As illustrated in FIG. 3, the movement condition CM in the fifth step ST15 is to execute "conditional branching processing." The "condition branching processing" is the processing of determining whether or not the switching condition CS is satisfied and determining a test condition to be executed next according to the determination result.

As illustrated in FIG. 3, the switching condition CS in the fifth step ST15 is that the test force FP is 15 N. Specifically, in the fifth step ST15, as described with reference to FIG. 4, the test execution unit 516 determines whether or not the test force FP is 15 N or more.

The test condition selection section 630 corresponds to the second object BJ2, the third object BJ3, and the fifth object BJ5. The test condition selection section 630 is configured as a so-called pull-down menu. When the test condition selection section 630 is clicked by the user, a menu (not illustrated) for selecting a displayable test condition is displayed.

In the menu, for example, "Main routine, Subroutine A, Subroutine B, Subroutine C, and Subroutine D" are displayed. "Main routine" is selected to display the first test condition CT1. "Subroutine A" is selected to display the second A test condition CT2A, and "Subroutine B" is selected to display the second B test condition CT2B. "Subroutine C" is selected to display the third A test condition CT3A, and "Subroutine D" is selected to display the third B test condition CT3B.

That is, the "predetermined operation" on the second object BJ2 is a click operation on the test condition selection section 630 and a selection operation of "Subroutine A" or "Subroutine B." The selection operation is, for example, clicking.

In addition, the "predetermined operation" on the third object BJ3 is a click operation on the test condition selection section 630 and a selection operation of "Main routine." The selection operation is, for example, clicking.

The "predetermined operation" on the fifth object BJ5 is a click operation on the test condition selection section 630 and a selection operation of "Subroutine C" or "Subroutine D." The selection operation is, for example, clicking.

The branch display section 640 corresponds to the first object BJ1. When the branch display section 640 is clicked by the user, the first branching condition display unit 512 displays the first branching condition display screen 700 illustrated in FIG. 4. That is, the branch display section 640 functions as a button object.

Figure 4:
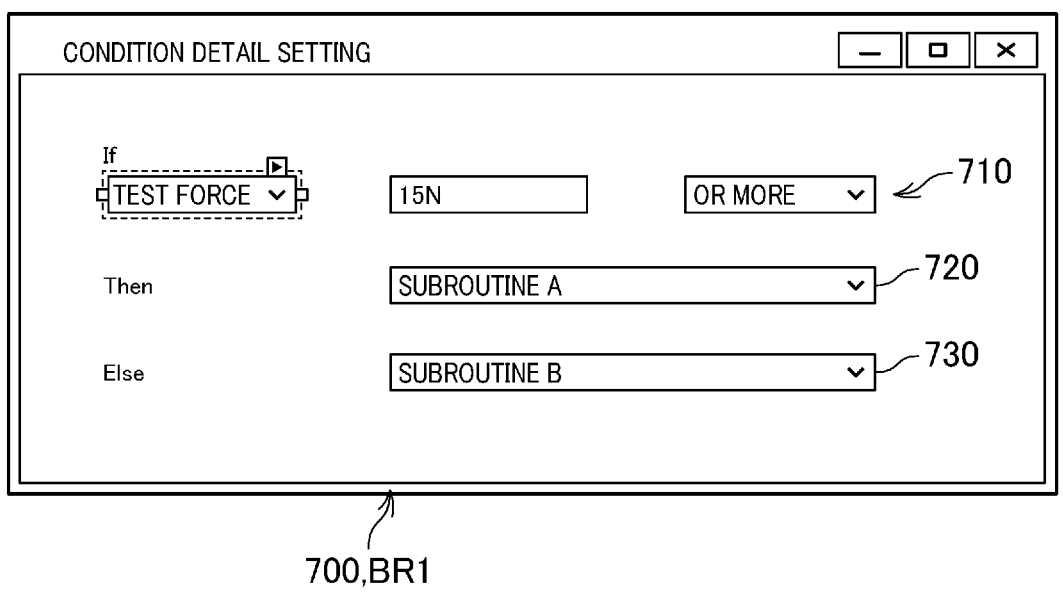
FIG. 4 is a screen view illustrating an example of a first branching condition display screen that displays a first branching condition.

FIG. 4 is a screen view illustrating an example of the first branching condition display screen 700 that displays the first branching condition CB1.

The first branching condition display screen 700 is, for example, popped up by the first branching condition display unit 512 when the user clicks on the branch display section 640 of the first condition display screen 600 illustrated in FIG. 3.

The first branching condition display screen 700 includes a first display section 710, a second display section 720, and a third display section 730.

The first display section 710 displays the first branching condition CB1. In FIG. 4, the first branching condition CB1 corresponds to, for example, a condition that "the test force is 15 N or more."

The second display section 720 indicates, for example, proceeding to "Subroutine A" when the first branching condition CB1 indicated on the first display section 710 is satisfied. "Subroutine A" corresponds to the second A test condition CT2A.

The third display section 730 indicates, for example, proceeding to "Subroutine B" when the first branching condition CB1 indicated on the first display section 710 is not satisfied. "Subroutine B" corresponds to the second B test condition CT2B.

FIG. 5 is a screen view illustrating an example of the second test condition display screen 650 that displays the second test condition CT2. The second test condition display screen 650 is displayed by the second condition display unit 513, for example, when "Subroutine A" is selected on the test condition selection section 630 of the first condition display screen 600 illustrated in FIG. 3.

The second test condition display screen 650 displays the second A test condition CT2A.

As illustrated in FIG. 5, the second test condition display screen 650 includes the movement condition display section 610, the switching condition display section 620, and the test condition selection section 630.

The second A test condition CT2A includes a first step ST21 and a second step ST22. That is, the second A test condition CT2A includes two steps ST.

The movement condition display section 610 displays the movement condition CM in each of the first step ST21 to the second step ST22. The switching condition display section 620 displays the switching condition CS of the first step ST21 in association with the movement condition CM.

As illustrated in FIG. 5, the movement condition CM in the first step ST21 is that the displacement velocity target value XVT is 1.000 mm/min.

That is, in the first step ST21, the test execution unit 516 executes the constant displacement velocity control as in the first step ST11 of the first test condition CT1 illustrated in FIG. 3.

In addition, as illustrated in FIG. 5, the switching condition CS in the first step ST21 is that the test force FP reaches 100 N. That is, when the test force FP reaches 100 N, the test execution unit 516 ends the movement of the first step ST21 and starts the movement of the second step ST22.

As illustrated in FIG. 5, the movement condition CM of the second step ST22 is displayed as "OFF," and the test execution unit 516 ends the tensile test in the second step ST22.

Since the test condition selection section 630 illustrated in FIG. 5 is the same as the test condition selection section 630 illustrated in FIG. 3, the description thereof will be omitted.

FIG. 6 is a screen view illustrating another example of the second test condition display screen 660 that displays the second test condition CT2. The second test condition display screen 660 is displayed by the second condition display unit 513, for example, when "Subroutine B" is selected in the test condition selection section 630 of the first condition display screen 600 illustrated in FIG. 3.

The second test condition display screen 660 displays the second B test condition CT2B.

As illustrated in FIG. 6, the second test condition display screen 660 includes the movement condition display section 610, the switching condition display section 620, the test condition selection section 630, and the branch display section 640.

In addition, the second B test condition CT2B includes a first step ST31, a second step ST32, a third step ST33, and a fourth step ST34. That is, the second B test condition CT2B includes four steps ST.

The movement condition display section 610 displays the movement condition CM in each of the first step ST31 to the fourth step ST34. The switching condition display section 620 displays the switching condition CS in each of the first step ST31 to the fourth step ST34 in association with the movement condition CM.

As illustrated in FIG. 6, the movement condition CM in the first step ST31 is that the displacement velocity target value XVT is 5.000 mm/min.

That is, in the first step ST31, the test execution unit 516 executes the constant displacement velocity control as in the first step ST11 of the first test condition CT1 illustrated in FIG. 3.

In addition, as illustrated in FIG. 6, the switching condition CS in the first step ST31 is that the test force FP reaches 100 N. That is, when the test force FP reaches 100 N, the test execution unit 516 ends the movement of the first step ST31 and starts the movement of the second step ST32.

As illustrated in FIG. 6, the movement condition CM in the second step ST32 is that the displacement velocity target value XVT is −5.000 mm/min.

That is, in the second step ST32, the test execution unit 516 executes the constant displacement velocity control as in the first step ST11 of the first test condition CT1 illustrated in FIG. 3.

In addition, as illustrated in FIG. 6, the switching condition CS in the second step ST32 is that the test force FP reaches 10 N. That is, when the test force FP reaches 10 N, the test execution unit 516 ends the movement of the second step ST32 and starts the movement of the third step ST33.

As illustrated in FIG. 6, the movement condition CM in the third step ST33 is that the displacement velocity target value XVT is 5.000 mm/min.

That is, in the third step ST33, the test execution unit 516 executes processing as in the first step ST31.

In addition, as illustrated in FIG. 6, the switching condition CS in the third step ST33 is that the test force FP reaches 100 N. That is, when the test force FP reaches 100 N, the test execution unit 516 ends the movement of the third step ST33 and starts the movement of the fourth step ST34.

As illustrated in FIG. 6, the movement condition CM is to execute "condition branching processing."

As illustrated in FIG. 6, the switching condition CS in the fourth step ST34 is that the displacement X is 10 mm. Specifically, in the fourth step ST34, as described with reference to FIG. 7, the test execution unit 516 determines whether or not the displacement X is 10 mm or more.

Since the test condition selection section 630 illustrated in FIG. 6 is the same as the test condition selection section 630 illustrated in FIG. 3, the description thereof will be omitted.

The branch display section 640 corresponds to the fourth object BJ4. When the branch display section 640 is clicked by the user, the second branching condition display unit 514 displays the second branching condition display screen 750 illustrated in FIG. 7.

Figure 7:
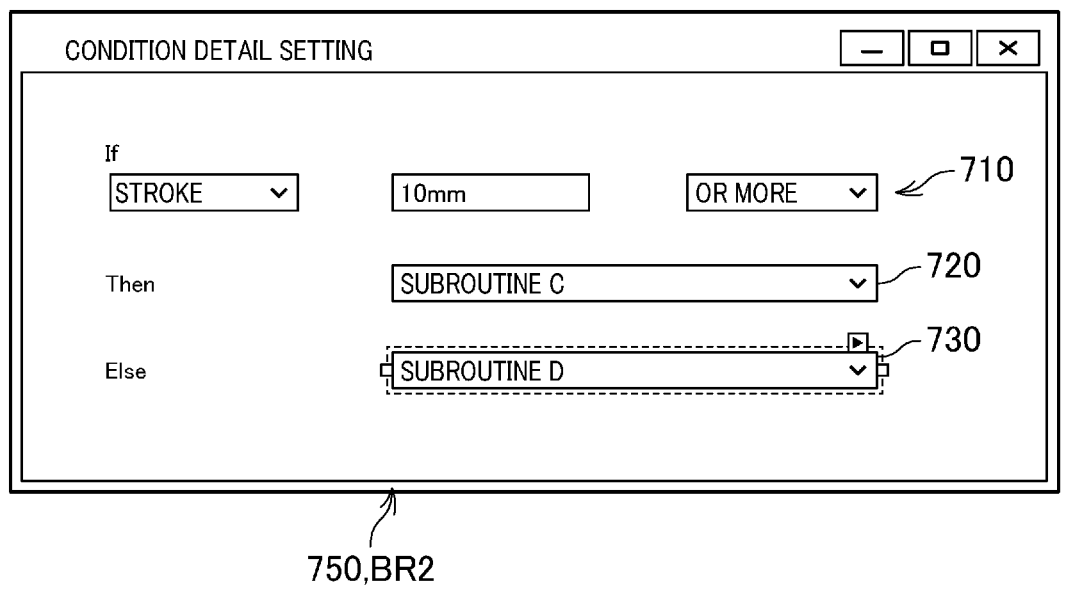
FIG. 7 is a screen view illustrating an example of a second branching condition display screen that displays a second branching condition.

FIG. 7 is a screen view illustrating an example of the second branching condition display screen 750 that displays the second branching condition CB2.

The second branching condition display screen 750 is, for example, popped up by the second branching condition display unit 514 when the user clicks on the branch display section 640 of the second test condition display screen 660 illustrated in FIG. 6.

The second branching condition display screen 750 includes a first display section 710, a second display section 720, and a third display section 730.

The first display section 710 displays the second branching condition CB2. The second branching condition CB2 corresponds to, for example, a condition that "a stroke is 10 mm or more." The "stroke" indicates displacement X.

The second display section 720 indicates, for example, proceeding to "Subroutine C" when the second branching condition CB2 indicated on the first display section 710 is satisfied. "Subroutine C" corresponds to the third A test condition CT3A.

The third display section 730 indicates, for example, proceeding to "Subroutine D" when the second branching condition CB2 indicated on the first display section 710 is not satisfied. "Subroutine D" corresponds to the third B test condition CT3B.

Figure 8:
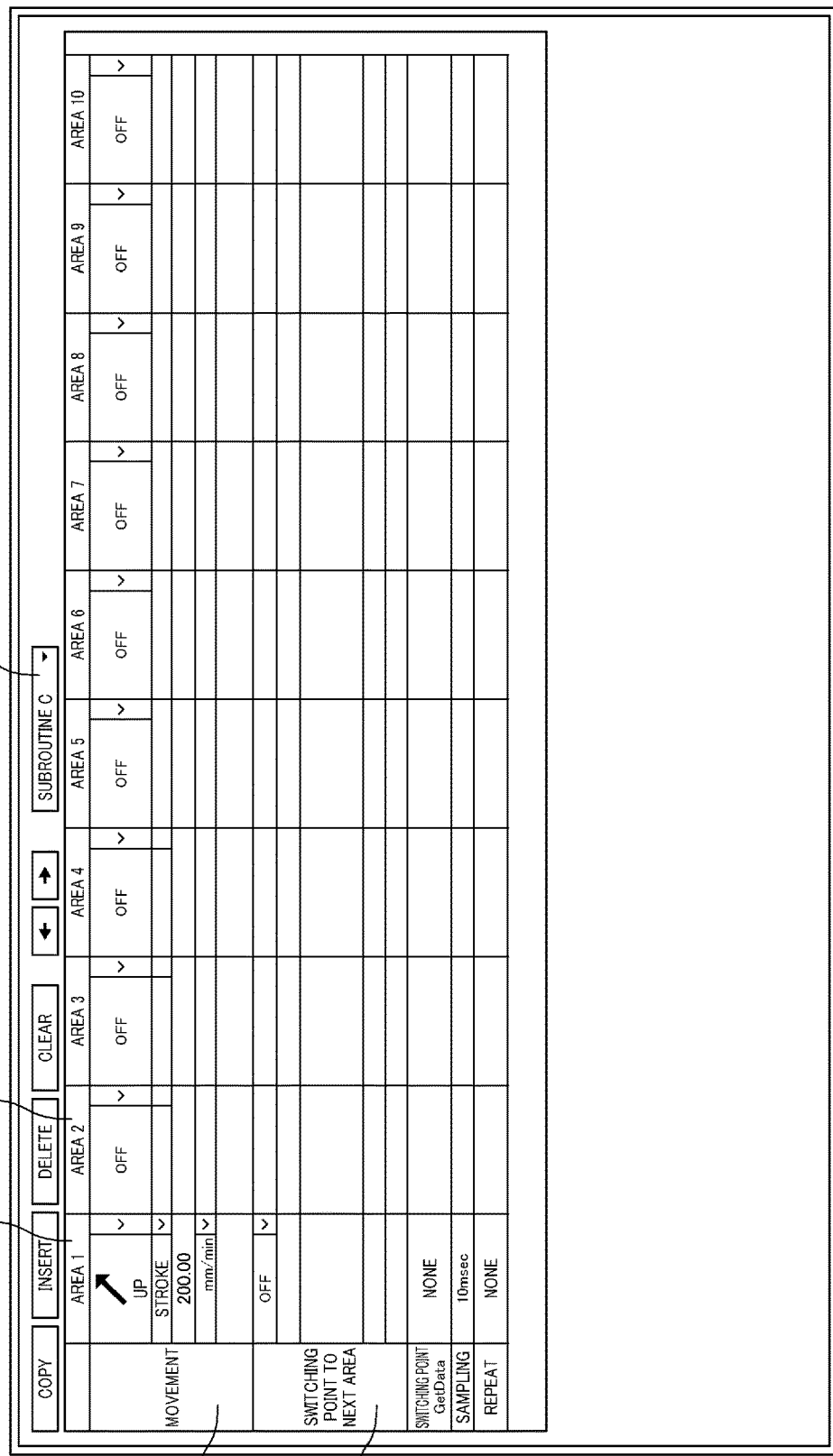
FIG. 8 is a screen view illustrating an example of a third test condition display screen that displays a third test condition.

FIG. 8 is a screen view illustrating an example of the third test condition display screen 670 that displays the third test condition CT3. The third test condition display screen 670 is displayed by the third condition display unit 515, for example, when "Subroutine C" is selected on the test condition selection section 630 of the second test condition display screen 660 illustrated in FIG. 6.

The third test condition display screen 670 displays the third A test condition CT3A.

As illustrated in FIG. 8, the third test condition display screen 670 includes the movement condition display section 610, the switching condition display section 620, and the test condition selection section 630.

The third A test condition CT3A includes a first step ST41 and a second step ST42. That is, the third A test condition CT3A includes two steps ST.

The movement condition display section 610 displays the movement condition CM in each of the first step ST41 to the second step ST42. The switching condition display section 620 displays the switching condition CS of the first step ST41 in association with the movement condition CM.

As illustrated in FIG. 8, the movement condition CM in the first step ST41 is that the displacement velocity target value XVT is 200.00 mm/min.

That is, in the first step ST41, the test execution unit 516 executes the constant displacement velocity control as in the first step ST11 of the first test condition CT1 illustrated in FIG. 3.

In addition, as illustrated in FIG. 8, the switching condition CS of the first step ST41 is displayed as "OFF," which indicates that the test execution unit 516 executes the constant displacement velocity control in the first step ST41 until the test piece TP breaks.

The movement condition CM of the second step ST42 is displayed as "OFF," and the test execution unit 516 ends the tensile test in the second step ST22.

Since the test condition selection section 630 illustrated in FIG. 8 is the same as the test condition selection section 630 illustrated in FIG. 3, the description thereof will be omitted.

Figure 9:
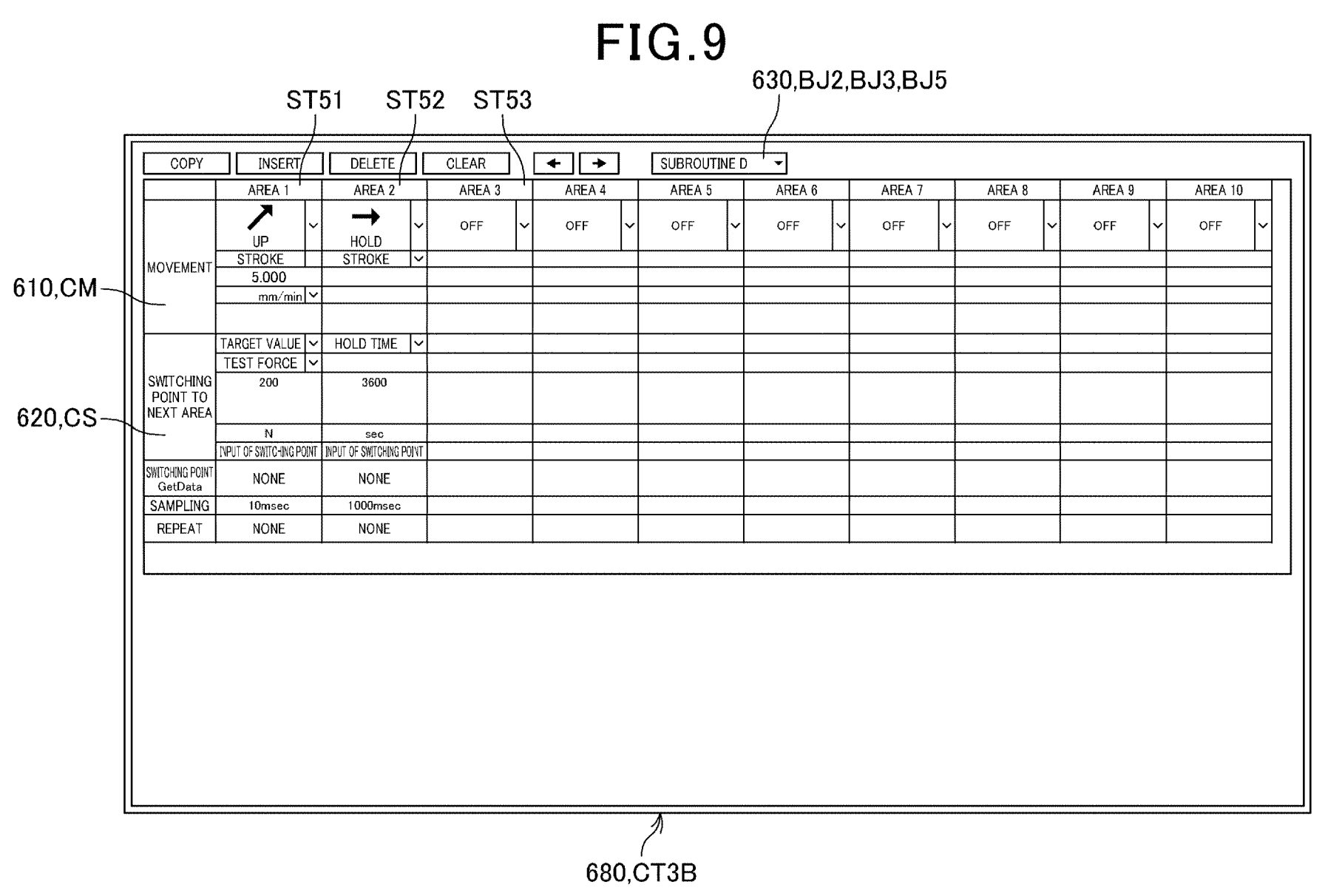

FIG. 9 is a screen view illustrating another example of the third test condition display screen 680 that displays the third test condition CT3.

The third test condition display screen 680 is displayed by the third condition display unit 515, for example, when "Subroutine D" is selected on the test condition selection section 630 of the second test condition display screen 660 illustrated in FIG. 6.

The third test condition display screen 680 displays the third B test condition CT3B.

As illustrated in FIG. 9, the third test condition display screen 680 includes the movement condition display section 610, the switching condition display section 620, and the test condition selection section 630.

The third B test condition CT3B includes a first step ST51, a second step ST52, and a third step ST53. That is, the third A test condition CT3A includes three steps ST.

The movement condition display section 610 displays the movement condition CM in each of the first step ST51 to the third step ST53. The switching condition display section 620 displays the switching condition CS in each of the first step ST51 and the second step ST52 in association with the movement condition CM.

As illustrated in FIG. 9, the movement condition CM in the first step ST51 is that the displacement velocity target value XVT is 5.00 mm/min.

That is, in the first step ST51, the test execution unit 516 executes the constant displacement velocity control as in the first step ST11 of the first test condition CT1 illustrated in FIG. 3.

In addition, as illustrated in FIG. 9, the switching condition CS in the first step ST51 is that the test force FP reaches 200 N. That is, when the test force FP reaches 200 N, the test execution unit 516 ends the movement of the first step ST51 and starts the movement of the second step ST52.

As illustrated in FIG. 9, the movement condition CM in the second step ST52 is to keep the displacement X constant.

That is, in the second step ST52, the test execution unit 516 executes the constant displacement control as in the second step ST12 of the first test condition CT1 illustrated in FIG. 3.

In addition, as illustrated in FIG. 9, the switching condition CS in the second step ST52 is that the movement time TM reaches 3600 sec. That is, when the elapsed time from the start of the movement of the second step ST52 reaches 3600 sec, the test execution unit 516 ends the movement of the second step ST52 and starts the movement of the third step ST53.

As illustrated in FIG. 9, the movement condition CM of the third step ST53 is displayed as "OFF," and the test execution unit 516 ends the tensile test in the third step ST53.

Since the test condition selection section 630 illustrated in FIG. 9 is the same as the test condition selection section 630 illustrated in FIG. 3, the description thereof will be omitted.

As described with reference to FIGS. 3, 5, 6, 8, and 9, the first condition display unit 511 displays the first test condition CT1 on the LCD 531, the second condition display unit 513 displays the second test condition CT2 on the LCD 531, and the third condition display unit 515 displays the third test condition CT3 on the LCD 531. Thus, the user can visually recognize the first test condition CT1, the second test condition CT2, and the third test condition CT3. Therefore, user convenience can be improved.

In addition, as described with reference to FIGS. 3, 5, 6, 8, and 9, a step ST included in each of the first test condition CT1, the second test condition CT2, and the third test condition CT3 includes the movement condition CM that defines a movement to be executed by the tester body 2 and the switching condition CS that switches the movement condition CM to a movement condition CM of a next step ST. Therefore, the user can visually recognize the movement condition CM and the switching condition CS of the step ST included in each of the first test condition CT1, the second test condition CT2, and the third test condition CT3. Therefore, user convenience can be improved.

In addition, as described with reference to FIGS. 4 and 7, the first branching condition display unit 512 displays the first branching condition CB1 on the LCD 531, and the second branching condition display unit 514 displays the second branching condition CB2 on the LCD 531. Therefore, the user can visually recognize the first branching condition CB1 and the second branching condition CB2. Therefore, user convenience can be improved.

Furthermore, as described with reference to FIGS. 4 and 7, the first branching condition display unit 512 displays the first branching condition CB1 on the LCD 531 when a predetermined operation is performed on the first object BJ1, and the second branching condition display unit 514 displays the second branching condition CB2 on the LCD 531 when a predetermined operation is performed on the fourth object BJ4. The first object BJ1 corresponds to the branch display section 640 of the first condition display screen 600 that displays the first test condition CT1, and the fourth object BJ4 corresponds to the branch display section 640 of the second test condition display screen 660 that displays the second test condition CT2. Therefore, the user can easily display the first branching condition CB1 and the second branching condition CB2. Therefore, user convenience can be improved.

4. Processing of the Controller

Next, processing of the controller 51 will be described with reference to FIGS. 10 to 12.

Figure 10:
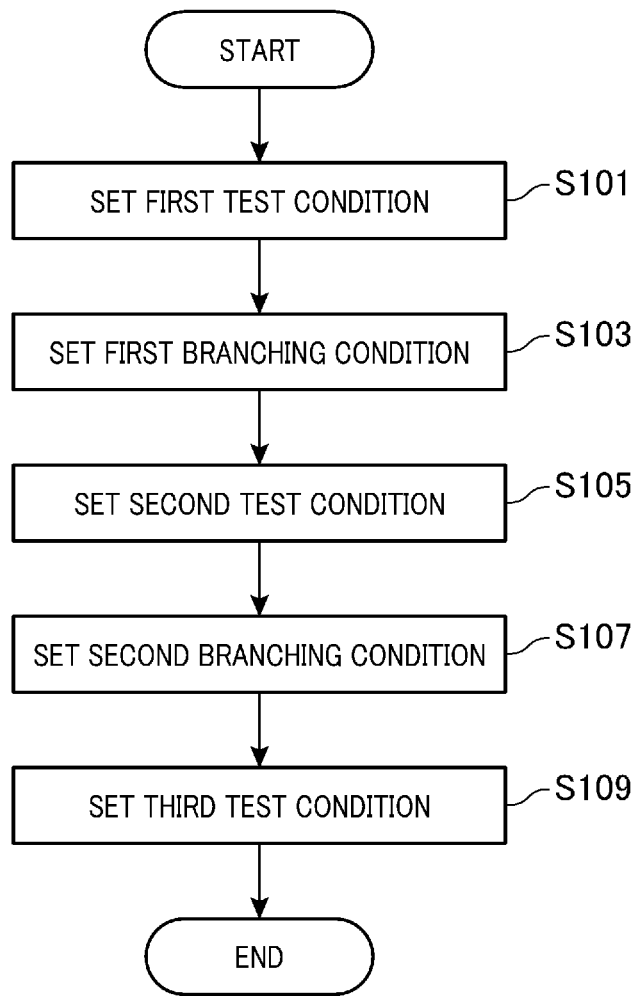
FIG. 10 is a flowchart illustrating an example of test condition setting processing of a controller according to the present embodiment.

FIG. 10 is a flowchart illustrating an example of "test condition setting processing" of the controller 51 according to the present embodiment. The "test condition setting processing" is the processing of setting the test condition CT. The "test condition setting processing" is executed by the first condition setting unit 501, the first branch setting unit 502, the second condition setting unit 503, the second branch setting unit 504, and the third condition setting unit 505.

First, in step S101, the first condition setting unit 501 sets the first test condition CT1 that is the test condition CT before the first branch point BR1, based on the user's operation on the operation unit 52.

Next, in step S103, the first branch setting unit 502 sets the first branching condition CB1 at the first branch point BR1 at which the first test condition CT1 branches into two or more second test conditions CT2 based on the user's operation on the operation unit 52.

Next, in step S105, the second condition setting unit 503 sets the second test condition CT2 that is the test condition CT after the first branch point BR1, based on the user's operation on the operation unit 52.

Next, in step S107, the second branch setting unit 504 sets the second branching condition CB2 at the second branch point BR2 at which the second test condition CT2 branches into two or more third test conditions CT3 based on the user's operation on the operation unit 52.

Next, in step S109, the third condition setting unit 505 sets the third test condition CT3 that is the test condition CT after the second branch point BR2, based on the user's operation on the operation unit 52. Thereafter, the processing ends.

As described with reference to FIG. 10, the first test condition CT1, the second test condition CT2, the third test condition CT3, the first branching condition CB1, and the second branching condition CB2 can be set by the first condition setting unit 501, the first branch setting unit 502, the second condition setting unit 503, the second branch setting unit 504, and the third condition setting unit 505.

Figure 11:
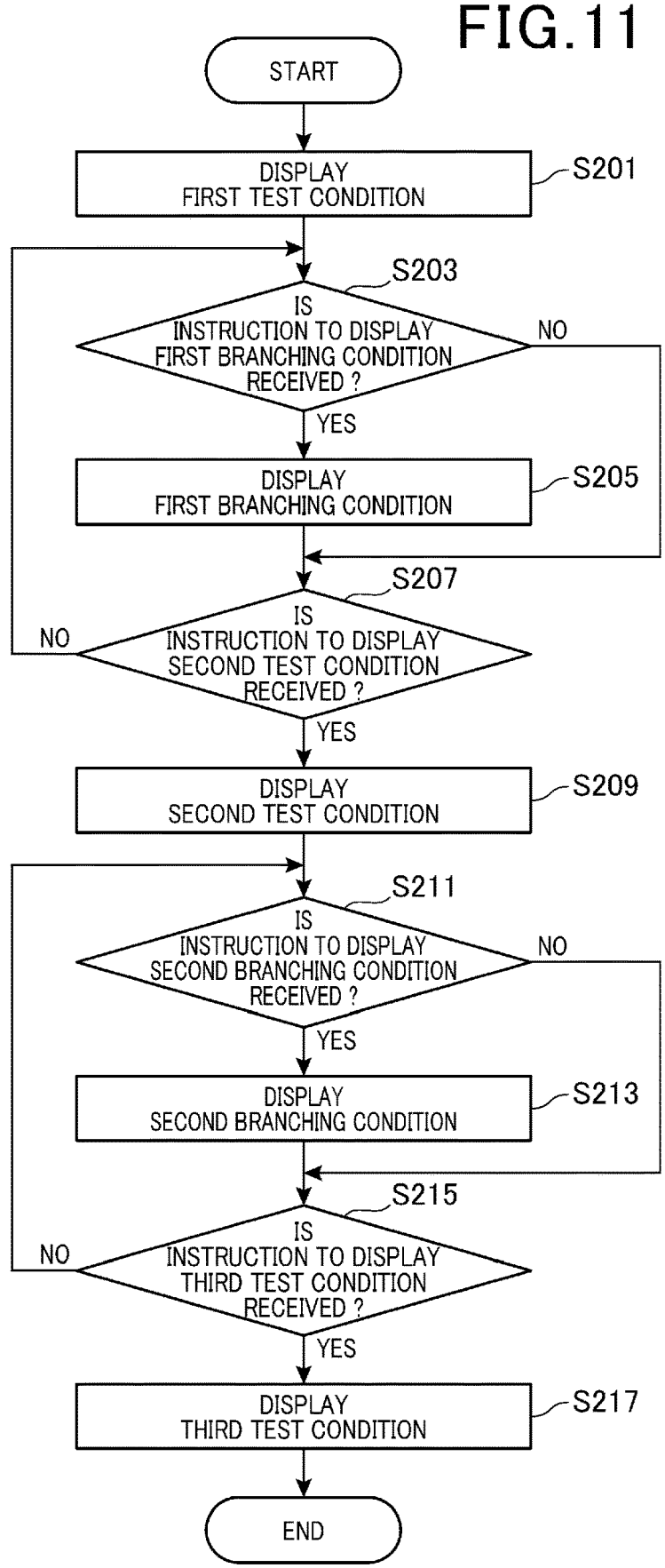
FIG. 11 is a flowchart illustrating an example of test condition display processing of the controller according to the present embodiment.

FIG. 11 is a flowchart illustrating an example of "test condition display processing" of the controller 51 according to the present embodiment. The "test condition display processing" is the processing of displaying the test condition CT on the LCD 531. The "test condition display processing" is executed by the first condition display unit 511, the first branching condition display unit 512, the second condition display unit 513, the second branching condition display unit 514, and the third condition display unit 515.

First, in step S201, the first condition display unit 511 displays the first test condition CT1 on the LCD 531 based on the user's operation on the operation unit 52.

Next, in step S203, the first branching condition display unit 512 determines whether or not an instruction to display the first branching condition CB1 has been received. The instruction to display the first branching condition CB1 corresponds to a predetermined operation on the first object BJ1.

When the first branching condition display unit 512 determines that the instruction to display the first branching condition CB1 has not been received (step S203: NO), the processing proceeds to step S207. When the first branching condition display unit 512 determines that the instruction to display the first branching condition CB1 has been received (step S203: YES), the processing proceeds to step S205.

Then, in step S205, the first branching condition display unit 512 displays the first branching condition CB1 on the LCD 531.

Next, in step S207, the second condition display unit 513 determines whether or not an instruction to display the second test condition CT2 has been received. The instruction to display the second test condition CT2 corresponds to a predetermined operation on the second object BJ2.

When the second condition display unit 513 determines that the instruction to display the second test condition CT2 has not been received (step S207: NO), the processing returns to step S203. When the second condition display unit 513 determines that the instruction to display the second test condition CT2 has been received (step S207: YES), the processing proceeds to step S209.

Then, in step S209, the second condition display unit 513 displays the second test condition CT2 on the LCD 531.

Next, in step S211, the second branching condition display unit 514 determines whether or not an instruction to display the second branching condition CB2 has been received. The instruction to display the second branching condition CB2 corresponds to a predetermined operation on the fourth object BJ4.

When the second branching condition display unit 514 determines that the instruction to display the second branching condition CB2 has not been received (step S211: NO), the processing proceeds to step S215. When the second branching condition display unit 514 determines that the instruction to display the second branching condition CB2 has been received (step S211: YES), the processing proceeds to step S213.

Then, in step S213, the second branching condition display unit 514 causes the LCD 531 to display the second branching condition CB2.

Next, in step S215, the third condition display unit 515 determines whether or not an instruction to display the third test condition CT3 has been received. The instruction to display the third test condition CT3 corresponds to a predetermined operation on the fifth object BJ5.

When the third condition display unit 515 determines that the instruction to display the third test condition CT3 has not been received (step S215: NO), the processing returns to step S211. When the third condition display unit 515 determines that the instruction to display the third test condition CT3 has been received (step S215: YES), the processing proceeds to step S217.

Then, in step S217, the third condition display unit 515 displays the third test condition CT3 on the LCD 531. Thereafter, the processing ends.

As described with reference to FIG. 11, the first condition display screen 600 illustrated in FIG. 3, the first branching condition display screen 700 illustrated in FIG. 4, the second test condition display screen 650 illustrated in FIG. 5, the second test condition display screen 660 illustrated in FIG. 6, the second branching condition display screen 750 illustrated in FIG. 7, the third test condition display screen 670 illustrated in FIG. 8, and the third test condition display screen 680 illustrated in FIG. 9 can be displayed by the first condition display unit 511, the first branching condition display unit 512, the second condition display unit 513, the second branching condition display unit 514, and the third condition display unit 515.

Figure 12:
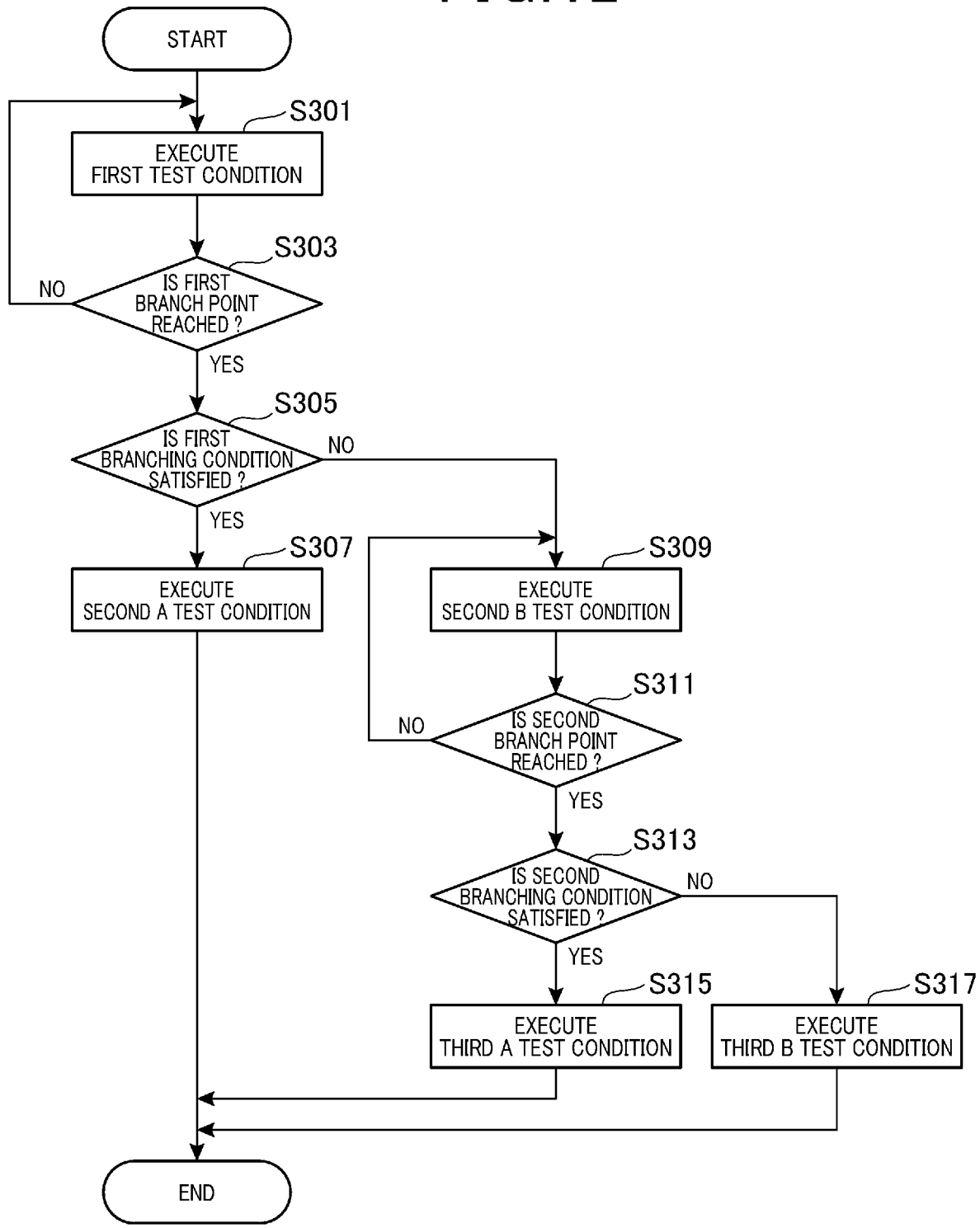
FIG. 12 is a flowchart illustrating an example of test execution processing of the controller according to the present embodiment.

FIG. 12 is a flowchart illustrating an example of "test execution processing" of the controller 51 according to the present embodiment. The "test execution processing" is the processing of causing the tester body 2 to execute a test corresponding to the test condition CT. The "test execution processing" is executed by the test execution unit 516.

First, in step S301, the test execution unit 516 causes the tester body 2 to execute a test corresponding to the first test condition CT1.

Next, in step S303, the test execution unit 516 determines whether or not the first branch point BR1 has been reached.

When the test execution unit 516 determines that the first branch point BR1 has not been reached (step S303: NO), the processing returns to step S301. When the test execution unit 516 determines that the first branch point BR1 has been reached (step S303: YES), the processing proceeds to step S305.

Then, in step S305, the test execution unit 516 determines whether or not the first branching condition CB1 is satisfied.

When the test execution unit 516 determines that the first branching condition CB1 is not satisfied (step S305: NO), the processing proceeds to step S309. When the test execution unit 516 determines that the first branching condition CB1 is satisfied (step S305: YES), the processing proceeds to step S307.

Then, in step S307, the test execution unit 516 causes the tester body 2 to execute a test corresponding to the second A test condition CT2A. Thereafter, the processing ends.

When the test execution unit 516 determines that the first branching condition CB1 is not satisfied (step S305: NO), the test execution unit 516 causes the tester body 2 to execute a test corresponding to the second B test condition CT2B in step S309.

Next, in step S311, the test execution unit 516 determines whether or not the second branch point BR2 has been reached.

When the test execution unit 516 determines that the second branch point BR2 has not been reached (step S311: NO), the processing returns to step S309. When the test execution unit 516 determines that the second branch point BR2 has been reached (step S311: YES), the processing proceeds to step S313.

Then, in step S313, the test execution unit 516 determines whether or not the second branching condition CB2 is satisfied.

When the test execution unit 516 determines that the second branching condition CB2 is satisfied (step S313: YES), the processing proceeds to step S315.

Then, in step S315, the test execution unit 516 causes the tester body 2 to execute a test corresponding to the third A test condition CT3A. Thereafter, the processing ends.

When the test execution unit 516 determines that the second branching condition CB2 is not satisfied (step S313: NO), the processing proceeds to step S317.

Then, in step S317, the test execution unit 516 causes the tester body 2 to execute a test corresponding to the third B test condition CT3B. Thereafter, the processing ends.

As described with reference to FIG. 12, the test execution unit 516 can execute a test corresponding to each of the first test condition CT1, the second A test condition CT2A, the second B test condition CT2B, the third A test condition CT3A, and the third B test condition CT3B.

5. Aspects and Effects

It is understood by those skilled in the art that the above-described present embodiment is a specific example of the following aspects.

(Item 1)

A material tester according to an aspect of the present invention includes a tester body having at least one detector and a controller, and the controller includes: a branch setting unit that sets a branching condition at a branch point at which a test condition branches into two or more test conditions in association with a detection result of the detector; a first condition setting unit that sets a first test condition that is a test condition before the branch point; and a second condition setting unit that sets a second test condition that is a test condition after the branch point.

According to the material tester described in item 1, the controller includes a branch setting unit that sets a branching condition at a branch point at which a test condition branches into two or more test conditions in association with a detection result of the detector, a first condition setting unit that sets a first test condition that is a test condition before the branch point, and a second condition setting unit that sets a second test condition that is a test condition after the branch point.

Therefore, it is possible to set a test condition branching into a plurality of test conditions during the test.

(Item 2)

In the material tester according to item 1 further including a display, the controller further includes a first condition display unit that displays the first test condition on the display, and a branching condition display unit that displays the branching condition on the display; the first condition display unit displays a first object that receives an instruction to display the branching condition on the display; and the branching condition display unit displays the branching condition on the display when a predetermined operation is performed on the first object.

According to the material tester described in item 2, the first condition display unit displays the first object that receives an instruction to display the branching condition on the display, and the branching condition display unit displays the branching condition on the display when a predetermined operation is performed on the first object.

Thus, the user can easily display the branching condition on the display. Therefore, the user can easily check the branching condition.

(Item 3)

In the material tester according to item 2, the controller further includes a second condition display unit that displays the second test condition on the display; the first condition display unit displays a second object that receives an instruction to display the second test condition on the display; and the second condition display unit displays the second test condition on the display when a predetermined operation is performed on the second object.

According to the material tester described in item 3, the first condition display unit displays a second object that receives an instruction to display the second test condition on the display, and the second condition display unit displays the second test condition on the display when a predetermined operation is performed on the second object.

Thus, the user can easily display the second test condition on the display. Therefore, the user can easily check the second test condition.

(Item 4)

In the material tester according to item 3, the second condition display unit displays a third object that receives an instruction to display the first test condition on the display, and the first condition display unit displays the first test condition on the display when a predetermined operation is performed on the third object.

According to the material tester described in item 4, the second condition display unit displays a third object that receives an instruction to display the first test condition on the display, and the first condition display unit displays the first test condition on the display when a predetermined operation is performed on the third object.

Thus, the user can easily display the first test condition on the display. Therefore, the user can easily check the first test condition.

(Item 5)

In the material tester according to any one of items 2 to 4, the first test condition includes a plurality of steps, and each of the plurality of steps includes a movement condition that defines a movement to be executed by the tester body and a switching condition that switches the movement condition to a movement condition of a next step.

According to the material tester described in item 5, the first test condition includes a plurality of steps, and each of the plurality of steps includes a movement condition that defines a movement to be executed by the tester body and a switching condition that switches the movement condition to a movement condition of a next step.

That is, the movement to be executed by the tester body is defined under the movement condition, and the movement condition is switched to the movement condition of the next step based on the switching condition. Thus, the operation and switching in each of the plurality of steps can be clearly defined by the movement condition and the switching condition. Therefore, the first test condition including a plurality of steps can be clearly defined.

(Item 6)

In the material tester according to item 5, the first condition display unit displays the movement condition and the switching condition that define each of the plurality of steps so that the steps are arranged in a horizontal direction or a vertical direction of the display.

According to the material tester described in item 6, the first condition display unit displays the movement condition and the switching condition that define each of the plurality of steps so that the steps are arranged in a horizontal direction or a vertical direction of the display.

Therefore, it is possible to display the movement condition and the switching condition that define each of the plurality of steps so as to be easily viewed by the user.

(Item 7)

In the material tester according to item 5 or 6, the material tester is a tensile testing device that applies a test force to a test piece to deform the test piece, the movement condition includes at least one of a target value of the test force, a target value of a velocity at which the test force changes, a target value of displacement of the test piece, and a target value of a velocity at which displacement of the test piece changes, and the switching condition includes at least one of a target value of the test force, a target value of displacement of the test piece, and a movement time TM.

According to the material tester described in item 7, the movement condition includes at least one of a target value of the test force, a target value of a velocity at which the test force changes, a target value of displacement of the test piece, and a target value of a velocity at which displacement of the test piece changes, and the switching condition includes at least one of a target value of the test force, a target value of displacement of the test piece, and a movement time TM.

Thus, it is possible to appropriately define the movement condition and the switching condition. Therefore, the first test condition can be appropriately defined, and can be easily displayed by the user.

6. Other Embodiments

The tensile tester 1 according to the present embodiment is merely an example of an aspect of the material tester according to the present invention, and may be arbitrarily modified and applied within the extent that it does not depart from the gist of the present invention.

For example, although the case where the material tester is the tensile tester 1 has been described in the present embodiment, the present embodiment is not limited thereto. The material tester merely needs to apply a test force to the test piece TP and deform the test piece TP to perform a material test. For example, the material tester may be a compression tester, a bending tester, or a torsion tester.

In addition, each functional unit illustrated in FIGS. 1 and 2 illustrates a functional configuration, and does not particularly limit a specific implementation form. That is, hardware individually corresponding to each functional unit does not need to be implemented, and it is of course possible to have a configuration such that the functions of a plurality of functional units are realized by one processor executing a program. In addition, some of the functions implemented by software in the above embodiments may be implemented by hardware, or some of the functions implemented by hardware may be implemented by software.

In the present embodiment, the case where the first test condition CT1 is branched into two test conditions CT (or the second A test condition CT2A and the second B test condition CT2B) has been described; however, the present embodiment is not limited thereto. The first test condition CT1 may be branched into three or more test conditions CT.

In the present embodiment, the case where the first object BJ1 is the branch display section 640 that functions as a button object has been described; however, the present embodiment is not limited thereto. The first object BJ1 may be an icon or a pull-down menu.

In the present embodiment, the case where the second object BJ2 and the third object BJ3 are the test condition selection section 630 that functions as a pull-down menu has been described; however, the present embodiment is not limited thereto. Each of the second object BJ2 and the third object BJ3 may be a button object or an icon.

In the present embodiment, the case where the first condition display unit 511 displays the movement condition CM and the switching condition CS in each of the plurality of steps ST included in the first test condition CT1 so that the steps are arranged in the horizontal direction of the LCD 531 has been described; however, the present embodiment is not limited thereto. The first condition display unit 511 may display the movement condition CM and the switching condition CS in each of the plurality of steps ST included in the first test condition CT1 so that the steps are arranged in the vertical direction of the LCD 531.

In the present embodiment, the case where the controller 51 is configured by a personal computer has been described; however, the present embodiment is not limited thereto. The controller 51 may be configured by one or more appropriate circuits such as an IC chip and an integrated circuit including an LSI. In addition, the controller 51 may be configured by, for example, a tablet terminal, a smartphone, or the like.

In the present embodiment, the case where the "display" is the LCD 531 has been described; however, the present embodiment is not limited thereto. The "display" may be, for example, a plasma display panel (PDP) or a cathode-ray tube (CRT) display.

The processing units of the flowcharts illustrated in FIGS. 10 to 12 are divided according to main processing contents to facilitate understanding of the processing of the controller 51. Without being limited by the division or name of the processing units illustrated in the flowcharts of FIGS. 10 to 12, the processing may be divided into more processing units or so that one processing unit includes more processing according to the processing content. In addition, the processing order of the above flowchart is not limited to the illustrated example.

The control device 50 of the tensile tester 1 causes the processor 51A included in the controller 51 to execute a control program. This control program may also be recorded in a computer-readable recording medium. For such a recording medium, a magnetic or optical recording medium, or a semiconductor memory device may be used. Specific examples thereof include portable or fixed recording media such as a flexible disk, an HDD, an SSD, a compact disk read only memory (CD-ROM), a DVD, a Blu-ray (registered trademark) disc, a magneto-optical disk, a flash memory, and a card-type recording medium. In addition, the recording medium may be a non-volatile storage device such as a RAM, a ROM, or an HDD that is an internal storage device included in the controller 51. Furthermore, the control program may be stored in a server device or the like and downloaded from the server device to the controller 51.

REFERENCE SINGS LIST

1 TENSILE TESTER (MATERIAL TESTER)
2 TESTER BODY
3 CONTROL UNIT
14 LOAD CELL (DETECTOR)
15 DISPLACEMENT SENSOR (DETECTOR)
19 LINEAR VARIABLE DIFFERENTIAL TRANSFORMER (DETECTOR)
50 CONTROL DEVICE
51 CONTROLLER
51A PROCESSOR
51B MEMORY
501 FIRST CONDITION SETTING UNIT
502 FIRST BRANCH SETTING UNIT (BRANCH SETTING UNIT)
503 SECOND CONDITION SETTING UNIT
504 SECOND BRANCH SETTING UNIT
505 THIRD CONDITION SETTING UNIT
511 FIRST CONDITION DISPLAY UNIT
512 FIRST BRANCHING CONDITION DISPLAY UNIT (BRANCHING CONDITION DISPLAY UNIT)
513 SECOND CONDITION DISPLAY UNIT
514 SECOND BRANCHING CONDITION DISPLAY UNIT
515 THIRD CONDITION DISPLAY UNIT
516 TEST EXECUTION UNIT
52 OPERATION UNIT
53 DISPLAY UNIT
531 LCD (DISPLAY)
600 FIRST CONDITION DISPLAY SCREEN
650, 660 SECOND TEST CONDITION DISPLAY SCREEN 670, 680 THIRD TEST CONDITION DISPLAY SCREEN
700 FIRST BRANCHING CONDITION DISPLAY SCREEN
750 SECOND BRANCHING CONDITION DISPLAY SCREEN
BJ1 FIRST OBJECT
BJ2 SECOND OBJECT
BJ3 THIRD OBJECT
BJ4 FOURTH OBJECT
BJ5 FIFTH OBJECT
BR1 FIRST BRANCH POINT (BRANCH POINT)
BR2 SECOND BRANCH POINT
CB1 FIRST BRANCHING CONDITION (BRANCHING CONDITION)
CB2 SECOND BRANCHING CONDITION
CM MOVEMENT CONDITION
CS SWITCHING CONDITION
CT TEST CONDITION
CT1 FIRST TEST CONDITION
CT2 SECOND TEST CONDITION
CT2A SECOND A TEST CONDITION
CT2B SECOND B TEST CONDITION
CT3 THIRD TEST CONDITION
CT3A THIRD A TEST CONDITION
CT3B THIRD B TEST CONDITION
ED ELONGATION MEASUREMENT VALUE
FP TEST FORCE
FT TEST FORCE TARGET VALUE
FVT TEST FORCE VELOCITY TARGET VALUE
ST STEP
ST11, ST21, ST31, ST41, ST51 FIRST STEP
ST12, ST22, ST32, ST42, ST52 SECOND STEP
ST13, ST33, ST53 THIRD STEP
ST14, ST34 FOURTH STEP
ST15 FIFTH STEP
TM MOVEMENT TIME
TP TEST PIECE
X DISPLACEMENT
XT DISPLACEMENT TARGET VALUE
XVT DISPLACEMENT VELOCITY TARGET VALUE

What is claimed is:

1. A material tester comprising:
a tester body including at least one detector, and a controller, wherein
the controller is configured to:
set a branching condition at a branch point at which a test condition branches into two or more test conditions in association with a detection result of the detector;
set a first test condition that is a test condition before the branch point; and
set a second test condition that is a test condition after the branch point.

2. The material tester according to claim 1, further comprising
a display, wherein
the controller is further configured to:
display the first test condition on the display; and
display the branching condition on the display,
the controller displays a first object that receives an instruction to display the branching condition on the display, and
the controller displays the branching condition on the display when a predetermined operation is performed on the first object.

3. The material tester according to claim 2, wherein
the controller displays the second test condition on the display,
the controller displays a second object that receives an instruction to display the second test condition on the display, and
the controller displays the second test condition on the display when a predetermined operation is performed on the second object.

4. The material tester according to claim 3, wherein
the controller displays a third object that receives an instruction to display the first test condition on the display, and
the controller displays the first test condition on the display when a predetermined operation is performed on the third object.

5. The material tester according to claim 2, wherein
the first test condition includes a plurality of steps, and
each of the plurality of steps includes a movement condition that defines a movement to be executed by the tester body and a switching condition that switches the movement condition to a movement condition of a next step.

6. The material tester according to claim 5, wherein
the controller displays the movement condition and the switching condition that define each of the plurality of steps so that the steps are arranged in a horizontal direction or a vertical direction of the display.

7. The material tester according to claim 5, wherein
the material tester is a tensile test device that applies a test force to a test piece to deform the test piece,
the movement condition includes at least one of a target value of the test force, a target value of a velocity at which the test force changes, a target value of displacement of the test piece, and a target value of a velocity at which the displacement of the test piece changes, and
the switching condition includes at least one of a target value of the test force, a target value of displacement of the test piece, and a movement time.

* * * * *